United States Patent Office 3,016,403
Patented Jan. 9, 1962

3,016,403
1-ARYL-3-HYDROXYPROPYL SULFONES AND PROCESSES
Raymond M. Dodson, Park Ridge, Ill., assignor to G. D. Searle & Co., Chicago, Ill., a corporation of Illinois
No Drawing. Filed July 29, 1955, Ser. No. 525,387
10 Claims. (Cl. 260—607)

This invention relates to 1-aryl-3-hydroxypropyl sulfones and processes for the manufacture thereof. More particularly this invention relates to compounds of the formula

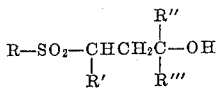

wherein R is a lower alkyl or a phenyl radical, R' is a phenyl or halophenyl radical, and each of R" and R'" is hydrogen or a methyl radical.

Among the lower alkyl radicals comprehended by R in the foregoing structural formula are methyl, ethyl, propyl, isopropyl, butyl, isobutyl, secondary butyl, tertiary butyl, amyl, secondary normal amyl, primary isoamyl, secondary isoamyl, tertiary amyl, and like $C_nH_{2n+1}$ groupings containing not more than 8 carbon atoms. The halophenyl radicals specified include, for example, 2-chloro-, 4-fluoro-, 2,4-diiodo-, 3,4-dichloro-, 3,5-dibromo-, and such other halogen-substituted phenyl radicals as are defined by the expression

wherein X represents halogen and X' is hydrogen or halogen.

The compounds of this invention are useful for the relief of conditions inimical to the well-being of the animal body. Specifically, the subject compounds manifest valuable anti-iritic properties.

The compounds to which this invention relates are soluble in lower alcohols and ketones—for example, methyl alcohol, ethyl alcohol, acetone, and the like—and in aqueous solutions of these materials, as well as in other organic solvents. The compounds may be therapeutically administered in solid form as tablets or capsules; dissolved in aqueous media, they may be given parenterally.

The claimed compounds are prepared by decarboxylative hydrolysis of an appropriate 3-aryl-2-oxotetrahydrofurylsulfone of the formula

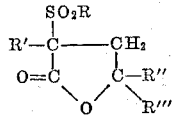

wherein R, R', and R", and R'" have the meanings hereinabove assigned. A strong base, such as potassium hydroxide, produces the desired cleavage in from 10 minutes to upward of 2 hours, heat being supplied to shorten the reaction time, and water being present. The oxofurylsulfones are derived from the corresponding 2-imino compounds by treatment in aqueous solution at 55–110° centigrade with a small amount of mineral acid. The imino compounds, in turn, are prepared as follows: A benzaldehyde or a halobenzaldehyde is reacted with an alkali metal cyanide and a sulfonyl chloride of the formula

M being defined as a monovalent hydrocarbon radical containing not more than 8 carbon atoms—the reaction preferably being carried out at reduced temperatures of the order of 0–5° centigrade using an aqueous medium—to give a hydrocarbonsulfonate of the formula

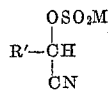

wherein R' is phenyl or halophenyl and M is defined as above. This sulfonate is then converted to a cyanosulfone of the formula

R being phenyl or a lower alkyl radical and R' having the meaning assigned before, by interaction in a polar solvent—for example, a ketonic solvent such as acetone—with thiourea and a sulfonyl chloride of the formula

wherein R is defined as above. Finally, the cyanosulfone is reacted with ethylene oxide in the presence of a base, using water as a solvent, to give the desired imino compound.

An exception to the foregoing procedure is the preparation of 5,5-dimethyl-2-oxo-3-phenyl-3-phenylsulfonyltetrahydrofuran, which is carried out by treating α-phenyl-α-phenylsulfonylacetonitrile with methallyl chloride in the presence of aqueous base to give α-methallyl-α-phenyl-α-phenylsulfonylacetonitrile. The latter substance, upon standing in contact with a mixture of glacial acetic and sulfuric acids, yields the desired oxofuran derivative aforesaid.

The following examples described in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

EXAMPLE 1

A. *α-Phenyl-α-phenylsulfonylacetonitrile.*—A mixture of 106 parts of benzaldehyde, 176 parts of benzenesulfonyl chloride, 49 parts of sodium cyanide, and 200 parts of water is maintained with stirring at 0–5° C. for 2½ hours. The precipitate which forms is recovered on a filter, washed thereon with water, and then dissolved in 560 parts of acetone. To this solution, with agitation, is added 176 parts of benzenesulfonyl chloride, followed portion-wise by 152 parts of thiourea. The slurry which forms is cooled at 0–5° C. for one hour and then treated with 400 parts of ethyl alcohol and 500 parts of water. The mixture is heated to 90° C., cooled, and filtered, in that order. The precipitate thus recovered is washed by suspension in water and then isolated by filtration, whereupon it is taken up in dilute aqeous potassium hydroxide. A small amount of insoluble material is filtered out, and the filtrate is then made acid with glacial acetic acid. The product which precipitates, crystallized from dilute aqueous acetone, is α-phenyl-α-phenylsulfonylacetonitrile, M.P. 148–150° C. The product has the formula

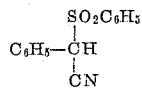

B. *2 - imino - 3 - phenyl-3-phenylsulfonyltetrahydrofuran.*—A solution of 257 parts of the cyanosulfone of the preceding Part A in 2500 parts of water containing 112 parts of potassium hydroxide is filtered and then reacted with 88 parts of ethylene oxide. The reagents are allowed to stand for 2 hours. After about 5 minutes an oil separates, a sample of which, triturated with anhydrous ether, crystallizes. The crystals thus obtained are used to seed the balance of the product. The material is filtered off and subsequently washed on the filter with a little water, following which it is taken up in methyl alcohol. The solution is treated with decolorizing charcoal, heated to boiling, and diluted with sufficient water to produce cloudiness, in that order. Upon cooling, a precipitate of 2-imino-3-phenyl-3-phenylsulfonyltetrahydrofuran comes down in good yield. The material shows M.P. 125–127° C. and has the formula

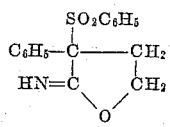

C. *2-oxo-3-phenyl-3-phenylsulfonyltetrahydrofuran.*—To a solution of 60 parts of hydrochloric acid in 250 parts of water is added 5 parts of the imino derivative of the preceding Part B. Approximately 235 parts of methyl alcohol is next introduced, following which the reactants are heated at 85–100° C. for 1 hour. The hot reaction mixture is then diluted with water until crystallization commences. Precipitation proceeds as the mixture cools. The crystalline product, 2-oxo-3-phenyl-3-phenylsulfonyltetrahydrofuran, shows M.P. approximately 125–125.5° C. Recrystallization from dilute aqueous methyl alcohol does not improve this melting point. The product has the formula

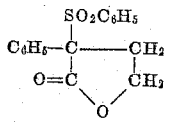

D. *3-phenyl-3-phenylsulfonylpropanol.*—A mixture of 3 parts of the furan derivative of the preceding Part C, 5 parts of potassium hydroxide, and 100 parts of water is heated at 90–100° C. for 2 hours. Partial solution occurs after 10 minutes, followed rapidly by precipitation of the desired product. At the end of the prescribed heating period, the reactants are cooled and the precipitate isolated by filtration. Washed first with water, this material is crystallized from aqueous methyl alcohol to give 3-phenyl-3-phenylsulfonylpropanol, M.P. 121–122° C. The product has the formula

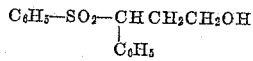

EXAMPLE 2

A. *α-Methallyl-α-phenyl-α-phenylsulfonylacetonitrile.*—A solution of 30 parts of α-phenyl-α-phenylsulfonylacetonitrile in 300 parts of water containing 10 parts of potassium hydroxide is filtered to remove insoluble matter, and to the filtrate is added 12 parts of methallyl chloride and 95 parts of alcohol. The reactants are vigorously agitated for ½ hour, following which crystallization is induced and the precipitate then filtered off and recrystallized from aqueous methyl alcohol. The α-methallyl-α-phenyl-α-phenylsulfonylacetonitrile thus obtained shows M.P. 89–90° C. and has the formula

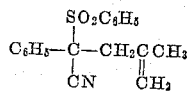

B. *5,5-dimethyl-2-oxo-3-phenyl-3-phenylsulfonyltetrahydrofuran.*—A solution of 20 parts of the nitrile of the preceding Part A of this example in 125 parts of glacial acetic acid is allowed to stand in contact with 44 parts of concentrated sulfuric acid for 64 hours. The reaction mixture is then poured into water, and the precipitate which forms is successively crystallized—first from a mixture of acetone and cyclohexane, and finally from aqueous methyl alcohol. The oxofuran derivative thus obtained shows M.P. approximately 144.5–146° C. and has the formula

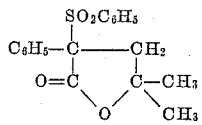

C. *1,1-dimethyl-3-phenyl-3-phenylsulfonylpropanol.*—A mixture of 3 parts of the furan derivative of the preceding Part B of this example, 10 parts of potassium hydroxide, and 200 parts of water is heated at 90–100° C. for 1 hour. The reactants are then allowed to stand for 96 hours at room temperatures, following which they are again heated at 90–100° C. for 1 hour. The reaction mixture is next extracted with ether, and the ether solution then evaporated to dryness. The residue is taken up in 160 parts of methyl alcohol, whereupon 10 parts of potassium hydroxide is introduced and the mixture thereupon heated at reflux temperatures for 2 hours in order that hydrolysis may be assured. The reaction mixture is filtered, and to the hot filtrate is added just less than the amount of water necessary to cause precipitation. Upon cooling, the crystalline product comes out of solution. Recrystallization from a mixture of acetone and cyclohexane, followed by recrystallization from aqueous methyl alcohol, affords pure 1,1-dimethyl-3-phenyl-3-phenylsulfonylpropanol, M.P. approximately 128.5–129.5° C. The product has the formula

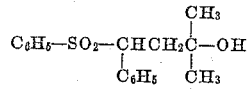

EXAMPLE 3

A. *α-Cyano-p-chlorobenzyl benzenesulfonate.*—A mixture of 70 parts of p-chlorobenzaldehyde, 88 parts of benzenesulfonyl chloride, 25 parts of sodium cyanide, and 100 parts of water is allowed to stand for 3 hours at 0–5° C. with occasional agitation. Cooling is then discontinued and the reaction mixture let stand for 1 hour at room temperature with continued occasional agitation. The aqueous layer is separated and discarded. The oily residue is purified by dissolution in a mixture of acetone, alcohol, and ether; filtration of this solution; and precipitation of the filtrate with 150 parts of ice. The oil which separates contains α-cyano-p-chlorobenzyl benzenesulfonate.

B. *α-(p-Chlorophenyl)-α-methylsulfonylacetonitrile.*—To a solution of 62 parts of α-cyano-p-chlorobenzyl benzenesulfonate and 23 parts of methanesulfonyl chloride in 80 parts of acetone is added, portion-wise with agitation over a 25-minute period, 30 parts of thiourea. After 15 minutes, a clear solution results. The reactants are allowed to stand for 3 hours, then diluted with 80 parts of ethyl alcohol and sufficient water to produce a clear solution. The solution is heated at 85–100° C. for half an hour, following which it is cooled, diluted with water, and extracted with ether, in that order. The ether extract is, in turn, extracted—first with water, and then with dilute aqueous potassium hydroxide. The alkaline extract, upon acidification, precipitates a crystalline solid which, crystallized from a mixture of benzene and petroleum ether, and then from methyl alcohol, shows M.P. approximately 116.5–117° C. This material is α-(p-chlorophenyl)-α-methylsulfonylacetonitrile.

C. *3-(p-chlorophenyl)-2-imino-3-methylsulfonyltetrahydrofuran.*—To a filtered solution of 140 parts of the cyanosulfone of the preceding Part B of this example in 2500 parts of water containing 56 parts of potassium hydroxide is added 44 parts of ethylene oxide. In a short time, an oil separates, a sample of which is induced to crystallize by conventional manipulation (for example, by standing in contact with anhydrous ether and/or scratching). The crystals thus obtained are used to seed the balance of the oily precipitate. The solid product which results is removed from the reaction mixture after 3 hours and washed throroughly with water. It shows M.P. 105–106° C. Recrystallization from dilute aqueous methyl alcohol does not improve this melting point. The product is 3-(p-chlorophenyl)-2-imino-3-methylsulfonyl-tetrahydrofuran.

D. *3-(p-chlorophenyl)-3-methylsulfonyl-2-oxo-tetrahydrofuran.*—To a solution of 7 parts of the imino compound of the preceding Part C of this example in 160 parts of methyl alcohol is added 60 parts of concentrated hydrochloric acid and 50 parts of water. The reactants are heated at 90–100° C. for ½ hour. On cooling, the desired 2-oxo compound is induced to crystallize. The product is recovered on a filter and purified by washing with water. It shows M.P. approximately 128.5–129° C.

E. *3-p-chlorophenyl-3-methylsulfonylpropanol.*—Using the technique of Example 1D above, 10 parts of the furan derivative of Part D of this example, 23 parts of potassium hydroxide, and 375 parts of water are reacted together to give 3-p-chlorophenyl-3-methylsulfonylpropanol, which, crystallized from a mixture of acetone and cyclohexane, shows M.P. approximately 83–84° C. The product has the formula

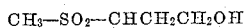

EXAMPLE 4

A. *α-Cyano-p-fluorobenzyl benzenesulfonate.*—By the technique of Example 3A above, 124 parts of p-fluorobenzaldehyde, 176 parts of benzenesulfonyl chloride, 49 parts of sodium cyanide, and 200 parts of water are reacted together for 3½ hours at 0–5° C. to produce α-cyano-p-fluorobenzyl benzenesulfonate in the form of an oil which is resistant to crystallization.

B. *α-(p-fluorophenyl)-α-phenylsulfonylacetonitrile.*—To a solution of 29 parts of α-cyano-p-fluorobenzyl benzenesulfonate—prepared as detailed in the preceding Part A of this example—and 17 parts of benzenesulfonyl chloride in 50 parts of acetone is added, portion-wise over a 30 minute period with agitation, 15 parts of thiourea. Agitation is continued for a further 2 hour period, following which the solid which precipitates in process is removed by filtration. The precipitate is extracted with acetone, and this acetone extract is combined with the acetone filtrate above. The combined acetone solutions are then concentrated to approximately one-half their original volume. Sufficient water is next added to the boiling concentrate to cause slight turbidity. Upon cooling, a light solid is percipitated which is purified by trituration in alcohol. The product is α-p-fluorophenyl-α-phenylsulfonylacetonitrile.

C. *3-(p-fluorophenyl)-2-imino-3-phenylsulfonyl-tetrahydrofuran.*—Using the technique of Example 1B, 137 parts of the cyanosulfone of the foregoing Part B of this example, 56 parts of potassium hydroxide, and 100 parts of ethylene oxide are reacted together in 1250 parts of water to produce 3-(p-fluorophenyl)-2-imino-3-phenylsulfonyltetrahydrofuran.

D. *3-(p-fluorophenyl)-2 - oxo-3-phenylsulfonyltetrahydrofuran.*—The imino compound of the preceding Part D of this example is converted to the corresponding oxo derivative by treatment with hydrochloric acid in aqueous medium according to the technique of Example 1C. The 3-(p-fluorophenyl)-2-oxo - 3 - phenylsulfonyltetrahydrofuran thus prepared is subjected to decarboxylative hydrolysis as described in Part E of this example, below.

E. *3-p-fluorophenyl-3-phenylsulfonylpropanol.*—Using the technique of Example 1D above, the furan derivative of Part D of this example is treated with potassium hydroxide and water to give 3-p-fluorophenyl-3-phenylsulfonylpropanol having the formula

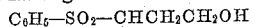

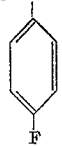

EXAMPLE 5

A. *α-Cyano-3,4-dichlorobenzyl benzenesulfonate.*—A mixture of 88 parts of 3,4-dichlorobenzaldehyde and 88 parts of benzenesulfonyl chloride is heated at 85–100° C. until solution is complete. The solution is cooled to room temperature, forming a thick paste. To this paste is added a solution of 25 parts of sodium cyanide in 75 parts of water. The reagents are maintained with agitation at 0–5° C. for 3 hours, whereupon the aqueous supernatant is decanted from the oily residue and the residue then washed well with water. The material thus obtained is α-cyano-3,4-dichlorobenzyl benzenesulfonate.

B. *α-(3,4 - dichlorophenyl) - α - methylsulfonylacetonitrile.*—To a solution of approximately 69 parts of the sulfonate of the preceding Part A of this example and 23 parts of methanesulfonyl chloride in 275 parts of acetone is added, portion-wise with agitation, 45 parts of thiourea. The reagents are allowed to stand with continued agitation. A precipitate forms after about 1 hour. Agitation is continued for 2 hours longer, at which point approximately 160 parts of ethyl alcohol is added, followed by sufficient water to dissolve insoluble matter. Precipitation reoccurs in a short time. The mixture is allowed to stand 12 hours at room temperature, diluted with water, and finally extracted several times with ether. The ether extracts are combined and extracted in turn with dilute aqueous potassium hydroxide. Upon acidification of the alkaline extract, an oil comes down, which granulates on standing. Fractional crystallization from aqueous acetone affords a good yield of α-(3,4-dichlorophenyl)-α-methylsulfonylacetonitrile, M.P. 156–158° C. The mother liquors, combined and chromatographed on silica gel, using benzene and ethyl acetate as developing solvents, return an additional amount of the desired product.

C. *3-(3',4'-dichlorophenyl)-2 - imino-3-methylsulfonyltetrahydrofuran.*—A solution of 538 parts of the cyanosulfone of the preceding Part B of this example in 5000 parts of water containing 224 parts of potassium hydroxide is reacted with 192 parts of ethylene oxide over a period of 1 hour. Precipitation occurs in process. The precipitate is filtered out, washed well with water, and crystallized from dilute aqueous methyl alcohol, in that order. It shows M.P. 133–135° C. Recrystallization from a mixture of acetone and cyclohexane does not alter this melting point. The product is 3-(3',4'-dichlorophenyl)-2-imino-3-methylsulfonyltetrahydrofuran.

D. *3-(3',4'-dichlorophenyl) - 3-methylsulfonyl - 2-oxotetrahydrofuran.*—Approximately 186 parts of the imino compound of Part C immediately preceding is dissolved in 2000 parts of methyl alcohol. To this solution is added 600 parts of hydrochloric acid and 1000 parts of water. Precipitation occurs. An additional 6400 parts of methyl alcohol is introduced to dissolve this precipitate. The reagents are heated for half an hour at 85–110° C. and then chilled. The product which precipitates in process shows M.P. 161–162.5° C. Recrystallization from dilute aqueous acetone does not alter this melting point. The product thus obtained is 3-(3',4'-dichlorophenyl)-3-methylsulfonyl-2-oxotetrahydrofuran.

E. *3 - (3',4' - dichlorophenyl) - 3 - methylsulfonylpropanol.*—A mixture of 2 parts of the furan derivative of the preceding Part D of this example, 5 parts of potassium hydroxide, and 100 parts of water is heated at 90–100° C. for 2 hours. Solution occurs after about 15 minutes. A short time later, a precipitate begins to form. The reactants are allowed to stand overnight at room temperatures. Precipitated material is then filtered out, washed with water, and finally crystallized from a mixture of acetone and cyclohexane. The 3-(3',4'-dichlorophenyl)-3-methylsulfonylpropanol thus obtained shows M.P. 93–94° C. and has the formula

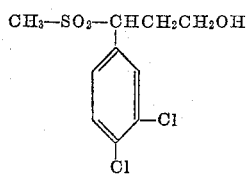

EXAMPLE 6

A. *α-Cyano-3,5-dibromobenzyl benzenesulfonate.*—A mixture of 133 parts of 3,5-dibromobenzaldehyde and 88 parts of benzenesulfonyl chloride is heated at 85–100° C. until solution is substantially complete. The reactants are cooled to room temperature, at which point a solution of 25 parts of sodium cyanide in 75 parts of water is introduced. The mixture is further cooled to 0–5° C., and maintained thereat with agitation for 3 hours, whereupon the aqueous supernatant is decanted from the oily residue, which is then washed well with water. The material thus obtained is α-cyano-3,5-dibromobenzenesulfonate.

B. *α-(3,5-dibromophenyl) - α - methylsulfonylacetonitrile.*—To a solution of approximately 87 parts of the sulfonate of the preceding Part A of this example and 23 parts of methanesulfonyl chloride in 275 parts of acetone is added, portion-wise with agitation, 31 parts of thiourea. The reagents are allowed to stand with continued agitation, precipitation occurring in process. After 3 hours, 160 parts of ethyl alcohol is introduced, followed by sufficient water to dissolve insoluble matter. Precipitation reoccurs. The mixture is allowed to stand 12 hours at room temperature, after which it is diluted with water, and finally extracted several times with ether. The ether extracts are combined and extracted in turn with dilute aqueous potassium hydroxide. Upon acidification of the alkaline extract, α-(3,5-dibromophenyl)-α-methylsulfonylacetonitrile is thrown out of solution.

C. *3-(3',5'-dibromophenyl) - 2 - imino - 3 - methylsulfonyltetrahydrofuran.*—A solution of 360 parts of the cyanosulfone of the preceding Part B of this example in approximately 4000 part of water containing 112 parts of potassium hydroxide is reacted with 96 parts of ethylene oxide over a period of 1 hour. Precipitation occurs in process. The precipitate is filtered out, washed well with water, and taken to the next step of the subject process without further purification. The product is 3 - (3',5' - dibromophenyl) - 2 - imino-3-methylsulfonyltetrahydrofuran.

D. *3 - (3',5'-dibromophenyl) - 3 - methylsulfonyl - 2 - oxotetrahydrofuran.*—Approximately 120 parts of the imino compound of the preceding Part C of this example is dissolved in 1000 parts of methyl alcohol. To this solution is added 300 parts of hydrochloric acid and 500 parts of water. Precipitation occurs. Sufficient additional methyl alcohol is introduced to dissolve this precipitate. The reagents are then heated for one-half hour at 85–110° C., after which they are allowed to cool to room temperatures. The product which precipitates is 3 - (3',5'-dibromophenyl) - 3 - methylsulfonyl - 2 - oxotetrahydrofuran.

E. *3 - (3',5'-dibromophenyl) - 3 - methylsulfonylpropanol.*—A mixture of 14 parts of the furan derivative of the preceding Part D of this example, 3 parts of potassium hydroxide, and 50 parts of water is heated at 90–100° C. for approximately 2 hours. The precipitate which forms in process is filtered out, dried in air, and purified by washing with water. The product thus obtained is 3-(3',5'-dibromophenyl)-3-methylsulfonylpropanol having the formula

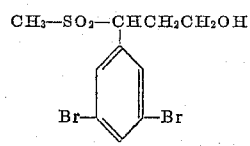

What is claimed is:
1. A compound of the formula

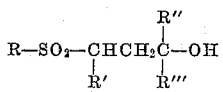

wherein R is selected from the group consisting of methyl and phenyl radicals, R' is selected from the group consisting of phenyl and halophenyl radicals, and each of R'' and R''' is selected from the group consisting of methyl radicals and hydrogen.

2. 3-phenyl-3-phenylsulfonylpropanol.
3. 1,1-dimethyl-3-phenyl-3-phenylsulfonylpropanol.
4. A compound of the formula

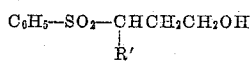

wherein R' is a halophenyl radical.

5. 3-p-fluorophenyl-3-phenylsulfonylpropanol.
6. A compound of the formula

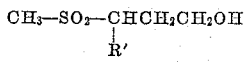

wherein R' is a halophenyl radical.

7. 3-p-chlorophenyl-3-methylsulfonylpropanol.
8. 3-(3',4'-dichlorophenyl)-3-methylsulfonylpropanol.
9. In a process for the manufacture of compounds of the formula

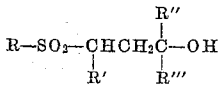

wherein R is selected from the group consisting of methyl and phenyl radicals, R' is selected from the group consisting of phenyl and halophenyl radicals, and each of R'' and R''' is selected from the group consisting of methyl radicals and hydrogen, the step which comprises contacting a furan derivative of the formula

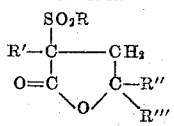

wherein R, R', R'', and R''' have the meanings hereinabove assigned, with a base in the presence of water.

10. In a process for the manufacture of compounds of the formula

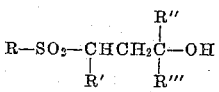

wherein R is selected from the group consisting of methyl and phenyl radicals, R' is selected from the group consisting of phenyl and halophenyl radicals, and each of R'' and R''' is selected from the group consisting of methyl radicals and hydrogen, the step which comprises contacting a furan derivative of the formula

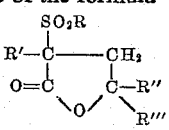

wherein R, R', R'', and R''' have the meanings hereinabove assigned, with aqueous potassium hydroxide.

No references cited.